United States Patent
Kurokawa et al.

(10) Patent No.: US 7,461,132 B2
(45) Date of Patent: Dec. 2, 2008

(54) SYSTEM AND METHOD FOR MANAGING DEVICES

(75) Inventors: Taisuke Kurokawa, Odawara (JP); Kosaku Kambayashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 752 days.

(21) Appl. No.: 11/034,887

(22) Filed: Jan. 14, 2005

(65) Prior Publication Data

US 2006/0112198 A1    May 25, 2006

(30) Foreign Application Priority Data

Nov. 25, 2004   (JP)   .............................. 2004-339805

(51) Int. Cl.
   *G06F 15/167*   (2006.01)
(52) U.S. Cl. .................. 709/213; 709/214; 709/215; 709/216
(58) Field of Classification Search ......... 709/203–219, 709/222–228; 711/100; 710/19
   See application file for complete search history.

(56) References Cited

U.S. PATENT DOCUMENTS 6,134,711 A * 10/2000 Nakamura et al. .......... 717/169

6,854,021 B1 *  2/2005  Schmidt et al. ................. 710/5
2003/0078964 A1 *  4/2003  Parrella et al. .............. 709/203
2004/0162940 A1 *  8/2004  Yagisawa et al. ............ 711/114

FOREIGN PATENT DOCUMENTS

EP       1 357 464 A2    1/2003
JP       2000-047898     8/1998

OTHER PUBLICATIONS

Bruno, L., "Containing the Chaos", Data Communications, McGraw Hill, vol. 25, No. 12, (Sep. 1, 1996), pp. 71-74, and 76.
Bruno, L., "Containing the Chaos", Data Communications, McGraw Hill, vol. 25, No. 12, (Sep. 1, 1996), pp. 71-74.
European Search Report dated Feb. 9, 2006.

* cited by examiner

*Primary Examiner*—Saleh Najjar
*Assistant Examiner*—Asad M Nawaz
(74) *Attorney, Agent, or Firm*—Reed Smith LLP; Stanley P. Fisher, Esq.; Juan Carlos A. Marquez, Esq.

(57) ABSTRACT

A device which is subject to management by the management unit comprises a storage region for storing device status information, which is information indicating a status relating to the device, and control sections for sending the device status information stored in this storage region to the management unit.

4 Claims, 7 Drawing Sheets

SYSTEM AND METHOD FOR MANAGING DEVICES

CROSS-REFERENCE TO PRIOR APPLICATION

This application relates to and claims priority from Japanese Patent Publication No. 2003-157180, and Japanese Patent Application No. 2004-339805, filed on Nov. 25, 2004 the entire disclosure of which is incorporated herein by reference.

FIELD OF THE INVENTION

The present invention relates to a technology for managing devices.

BACKGROUND OF THE INVENTION

A method for managing devices is known in which a terminal for maintaining devices (hereafter, called a "maintenance terminal") is prepared, the maintenance terminal thus prepared is connected to a device, and the status of the device is acquired by operating the maintenance terminal.

A generic computer may be used as the device subject to maintenance, for example. When carrying out maintenance tasks with respect to a plurality of generic computers, a technique as disclosed in Japanese Patent Laid-open No. 2000-47898, for example, can be employed. According to this technology, a SVP (Service Processor) is installed in each of the plurality of generic computers. Each SVP is connected to the other SVPs. A maintenance work console is connected to one of the plurality of SVPs. The maintenance work console is able to send a maintenance procedure to the other SVPs, via the SVP to which it is connected.

SUMMARY OF THE INVENTION

However, it is also possible to employ a storage control device comprising a plurality of storage device (for example, hard disk drives) as the device that is managed. It should be desirable from the viewpoint of the user to employ a storage control device that is inexpensive but affords high reliability. Moreover, it should also be desirable to provide a configuration whereby a storage system of larger capacity can be constructed by adding on storage control devices. The present inventors devised a management method by envisaging cases such as this.

FIG. 1 is an example of the composition of a storage system devised by the present inventors.

A plurality of (for example, two) storage control devices 401A and 401B are connected to a LAN (Local Area Network) 416. The storage control devices 401A and 401B have substantially the same composition. Therefore, in FIG. 1, for the plurality of the storage control devices 401A and 401B, the same parent reference number is applied to constituent elements that are the same, and different subsidiary symbols (A or B) are applied after these parent numbers, for the sake of convenience. Where a constituent element is described using the parent number only, the description applies to all such elements, whatever their subsidiary symbol. Below, the storage control device 401A is described as a representative example.

A host device 421a for sending a data write command or read command (hereafter, called "I/O request") is connected to the storage control device 401A. The storage control device 401A comprises a shared memory (hereafter, SM) 405A, a cache memory (hereafter, "CM") 406A, one or a plurality of channel adapters (hereafter, CHA) 402A, one or a plurality of disk adapters (hereafter, DKA) 403A, a coupled logic section 407A, a storage device 404A, an environment monitoring section 408A, a sub-service processor (hereafter, S-SVP) 409A, and a service processor (hereafter, SVP) 410A.

The CHA 402A is provided with a channel port section 411A connected to a host device 421A, a data transfer section 412A for transferring data, and a local memory (hereafter, LM) 441A capable of storing computer programs, such as a control program 443A. Furthermore, the CHA 402A also comprises a microprocessor (hereafter, MP) 413A for reading in computer programs, such as the control program 443A, from the LM 441A, and a LAN controller (hereafter, LANC) 415A for controlling communications via the LAN 416. The processing implemented by the CHA 402A can be controlled by the MP 413A. By means of the MP 413A, data is transferred between the host device 421A and the CM 406A, via the channel port section 411A, the data transfer section 412A and the coupled logic section 407A.

The DKA 403A comprises a drive port section 514A connected to the storage device 404A, a data transfer section 512A for performing data transfer, and an LM 541A capable of storing computer programs, such as the control program 543A. The DKA 403A also comprises an MP 513A which reads in computer programs, such as the control program 543A, from the LM 541A, and a LANC 515A which controls communications via the LAN 416. The processing implemented by the DKA 403A can be controlled by the MP 513A. By means of the MP 513A, data is transferred between the CM 406 and the storage device 404A, via the coupled logic section 407A and the drive port section 514A.

The coupled logic section 407A connects together the CHAs 402A, the DKAs 403A, the CM 406A and the SM 405A. The coupled logic section 407A may be composed, for example, in the form of a high-speed bus, such as an ultra-high-speed cross-bar switch, which performs data transfer by means of a high-speed switching operation. Furthermore, the coupled logic section 407A may also be constituted by a communications network, such as a LAN or SAN, and furthermore, it may also be constituted by a plurality of networks, as well as the aforementioned high-speed bus.

For the storage device 404A, it is possible to use devices such as a hard disk, flexible disk, magnetic tape, semiconductor memory, optical disk, or the like.

The environment monitoring section 408A is a device for monitoring the environmental status relating to the storage control device 401A. The environmental monitor section 408A is connected to a variety of sensors 423A, such as temperature sensors, for example, and it is able to determine various environmental statuses (such as the power source of the storage control device 401A, the temperature at a particular position, the rotating/non-rotating status of the cooling fan, and the like), from the signal value from the various sensors 423A. The environmental monitor section 408A transfers information indicating the determined environmental status (hereinafter, called "environmental status information") to the S-SVP 409A, via a signal line 417A, at periodic intervals or prescribed timings (for example, when the determined environmental status indicates an abnormality).

The S-SVP 409A is a device (such as a circuit board) fitted with a microprocessor 427A. The S-SVP 409A converts the environmental status information from the environmental monitor section 408A into a format that can be interpreted by the SVP 410A, and it transfers the converted environmental status information to the SVP 410A. Furthermore, the S-SVP 409A monitors whether or not the SVP 410A is operating normally, for example.

The SVP 410A is a device used by an administrator in order to maintain or manage the storage control device 401A. The SVP 401A is provided with both a control system and an input/output system, and it may be a notebook PC, for example. More specifically, for example, the SVP 410A comprises an input/output device 435A and a management unit 445A. The input/output device 435A comprises an input device, such as a keyboard, and an output device, such as a display screen. The management unit 445A is a device (a circuit board such as a motherboard) that is provided with a processor 431A, a storage region (for example, a memory) 433A, and a LANC 471A. The processor 431A receives environmental status information from the S-SVP 409A, and stores the received environmental status information in the storage region 433A. Furthermore, the processor 431A sets information input from the input/output device 435A in the CHAs 402A or the DKAs 403A, and displays the environmental status information stored in the storage region 433A on the input/output device 435A.

The foregoing provides an example of the composition of a storage system devised by the present inventors.

It is also possible to use a personal computer, for example, as an SVP 410. However, the cost of a personal computer is high. Since at least one SVP 410 is installed in each storage control device 401, the greater the number of storage control devices 401 provided in one storage system, the greater the number of SVPs, and hence the greater the cost.

Therefore, the present inventors attempted to manage a plurality of storage control devices 401 by means of one SVP 410 (for example, the management unit 445 in the SVP 410, in particular) However, it was discovered that handling a plurality of storage control devices 401 by means of one SVP 410 is not straightforward, due to the following two typical reasons.

(1) First Reason

When one SVP 410 is used, in the storage control devices 401 that are not installed with the SVP 410, the environmental monitor section 408 or the S-SVP 409 is connected to the LAN 416. Therefore, it is necessary to provide a LANC or an equivalent function, in the environment monitoring section 408 or the S-SVP 409. However, in this case, since the cost of the environment monitoring section 408 or S-SVP 409 installed in each storage control device 401 is high, there is no substantial merit in managing a plurality of storage control devices 401 by means of a single SVP 410.

(2) Second Reason

In a particular storage system, an IP address is assigned to the plurality of MPs 413 and 513 installed in the CHAs 402 and the DKAs 403, on the basis of the serial number of the storage control device 401 in which they are installed. Even if the serial number for any given model is a unique number for that model, it may not be unique with respect to other models and hence it is possible that the same serial number may exist. Therefore, when seeking to manage a plurality of storage control devices 401 by means of a single SVP 410, the SVP 410 may not be able to identify the MP 413 or 513 uniquely. For example, the IP address of the MP 413A in the storage control device 401A and the IP address of the MP 413B in another storage control device 401B may be the same.

The aforementioned problems are not limited to cases where the object of maintenance is a storage control device, and they may also arise in the case of other types of device.

Therefore, it is an object of the present invention to resolve problems arising when a plurality of devices are managed by one management unit.

Further objects of the present invention will become apparent from the following description.

The system according to one aspect of the present invention comprises: a management unit; a first device connected to the management unit; and a second device connected to the management unit. The first device comprises: a first storage region for storing first device status information which is information indicating a status relating to the first device; and a first control section for sending first device status information stored in the first storage region to the management unit. The second device comprises: a second storage region for storing second device status information which is information indicating a status relating to the second device; and a second control section for sending second device status information stored in the second storage region to the management unit.

Here, the first device and second device are the devices managed by the management unit. The first device and second device maybe personal computers, or storage control devices, for example. This system may be employed with a mainframe system or an open type storage system.

Moreover, the management unit may be set in at least the control system, of the control system and the input/output system. More specifically, for example, the management unit may be a circuit board, such as a motherboard. A processor and a memory, or the like, may be mounted on this circuit board.

In one embodiment of this system, the first control section and the management unit can be connected by means of a communications network. The second control section and the management unit can be connected by means of the communications network or another communications network. The system may comprise a subsidiary management unit for managing whether or not the management unit is operating normally. The subsidiary management unit is not connected to the communications network or the other communications network, but is connected to the management unit.

In a second embodiment of this system, the first device and the second device may respectively have a first ID and a second ID. There may be cases where the second ID of the first device and the second ID of the second device are the same as each other, even if the first ID of the first device and the first ID of the second device are different to each other. The first control section, the second control section and the management unit may be connected to a communications network which allows communications to be performed on the basis of IP addresses. The management unit may generate a first IP address on the basis of the second ID of the first device, generate a second IP address on the basis of the second ID of the second device, check whether or not the first IP address and the second IP address are mutually duplicating, and output the result of the check.

Here, the first ID is a device name or model name, for example. The second ID is the serial number of the device, for example.

In a third embodiment of this system, the first device may further comprise a first status writing unit which inputs a status relating to the first device, and writes the information indicating a status thus input, to the first storage region, as the first device status information. The second device may further comprise a second status writing unit which inputs a status relating to the second device, and writes the information indicating a status thus input, to the second storage region, as the second device status information.

In a fourth embodiment of this system, the first control section may be a first processor which operates by reading in a first computer program. The second control section may be a second processor which operates by reading in a second computer program. The first device may comprise a first memory having a plurality of storage regions including the first storage region. The second device may comprises a second memory having a plurality of storage regions including the second storage region. The first computer program read in by the first processor may refer to the first storage region, and if it detects that the first device status information is stored in the first storage region, then it may send the first device status information to the management unit; and the second computer program read in by the second processor may refer to the second storage region, and if it detects that the second device status information is stored in the second storage region, then it may send the second device status information to the management unit.

In a fifth embodiment of this system, in the fourth embodiment, at least the first device may be a storage control device provided with a storage device capable of storing data. The storage control device may be connected to a host device which transmits a write command for writing data to the storage device or a read command for reading out data from the storage device. If the first computer program seeks to refer to the first storage region while the write command or the read command is being processed, then the first computer program may refer to the first storage region when the processing of the write command or read command has finished. Furthermore, the storage device may be a physical storage device or a logical storage device, for example. Moreover, the storage control device may be a personal computer, a hard disk drive comprising hard disks, or a disk array device comprising a plurality of storage devices, for example.

In a sixth embodiment of this system, the first device and the second device may respectively have a first ID and a second ID. There may be cases where the second ID of the first device and the second ID of the second device are the same as each other, even if the first ID of the first device and the first ID of the second device are different to each other. The first control section may be a first processor which operates by reading in a first computer program. The second control section may be a second processor which operates by reading in a second computer program. The first processor, the second processor and the management unit may be connected to a communications network which allows communications to be performed on the basis of IP addresses. The system may comprise a subsidiary management unit for managing whether or not the management unit is operating normally. The subsidiary management unit is not connected to the communications network, but is connected to the management unit. The management unit may generate a first IP address on the basis of the second ID of the first device, generate a second IP address on the basis of the second ID of the second device, check whether or not the first IP address and the second IP address are mutually duplicating, and output the result of the check. The first device may comprise a first memory having a plurality of storage regions including the first storage region, and a first status writing unit which inputs a status relating to the device, and writes the information indicating a status thus input, to the first storage region, as the first device status information. The second device may comprise a second memory having a plurality of storage regions including the second storage region, and a second status writing unit which inputs a status relating to the device, and writes the information indicating a status thus input, to the second storage region, as the second device status information. The first computer program read in by the first processor may refer to the first storage region, and if it detects that the first device status information is stored in the first storage region, then it sends the first device status information to the management unit via the communications network. The second computer program read in by the second processor may refer to the second storage region, and if it detects that the second device status information is stored in the second storage region, then it may send the second device status information to the management unit via the communications network.

The principles of the system described above may be applied to devices or methods which are subject to management.

For example, the device according to a second aspect of the present invention can be connected to a management unit and may comprise a storage region for storing device status information, which is information indicating a status relating to the device; and a control section for transmitting the device status information stored in the storage region to the management unit.

Moreover, for example, the method according to a third aspect of the present invention may comprise the steps of: storing first device status information which is information indicating a status relating to a first device, in a first storage region; sending the first device status information stored in the first storage region to a management unit; storing second device status information which is information indicating a status relating to a second device, in a second storage region; and sending the second device status information stored in the second storage region to the management unit.

DETAILED DESCRIPTION OF THE PREFERRED EMBODIMENT

Below, several practical examples relating to one embodiment of the present invention are described with reference to the drawings.

PRACTICAL EXAMPLE 1

Figure 1:
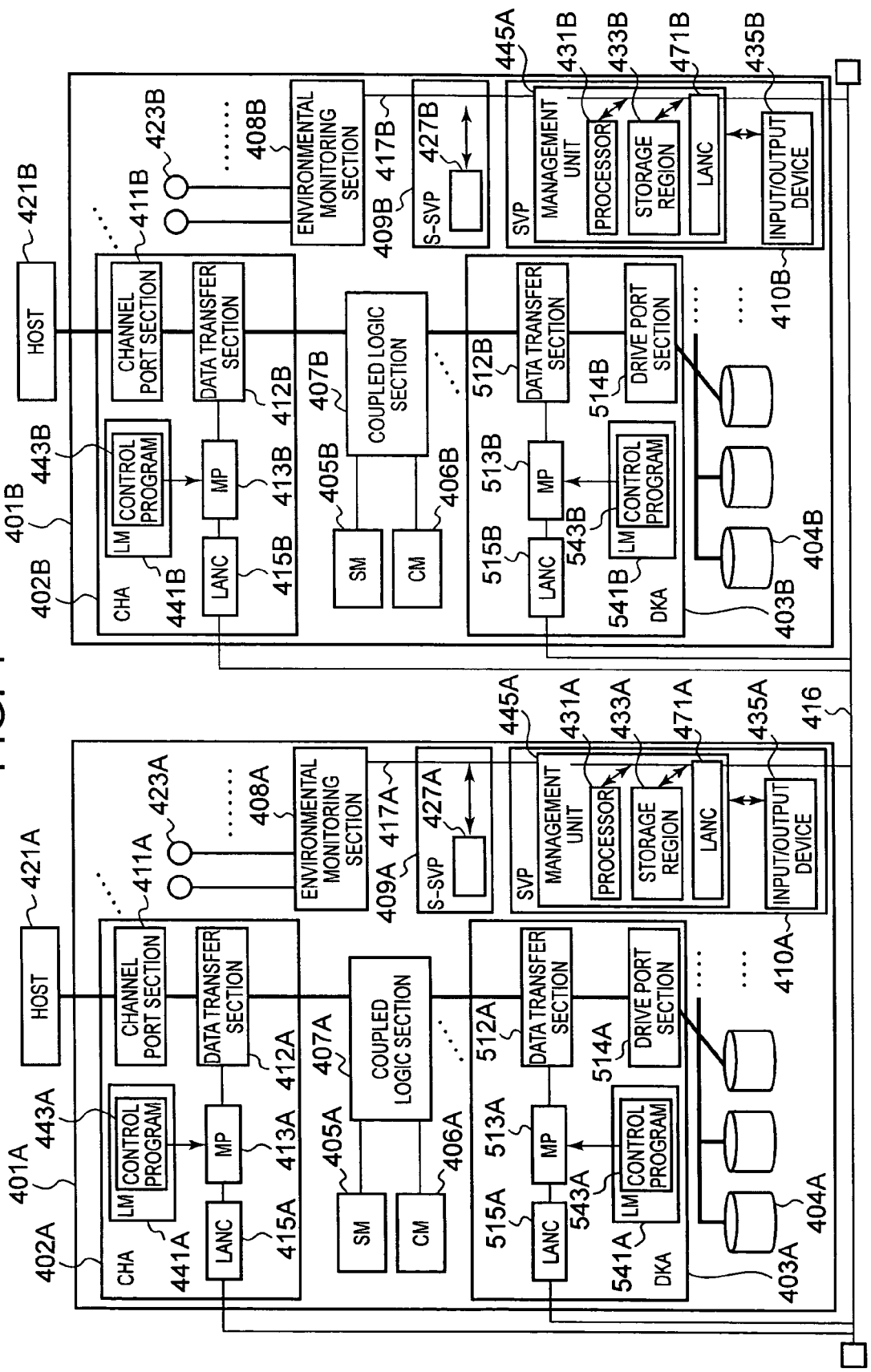
FIG. 1 shows an example of the composition of a storage system devised by the present inventors.
Figure 2:
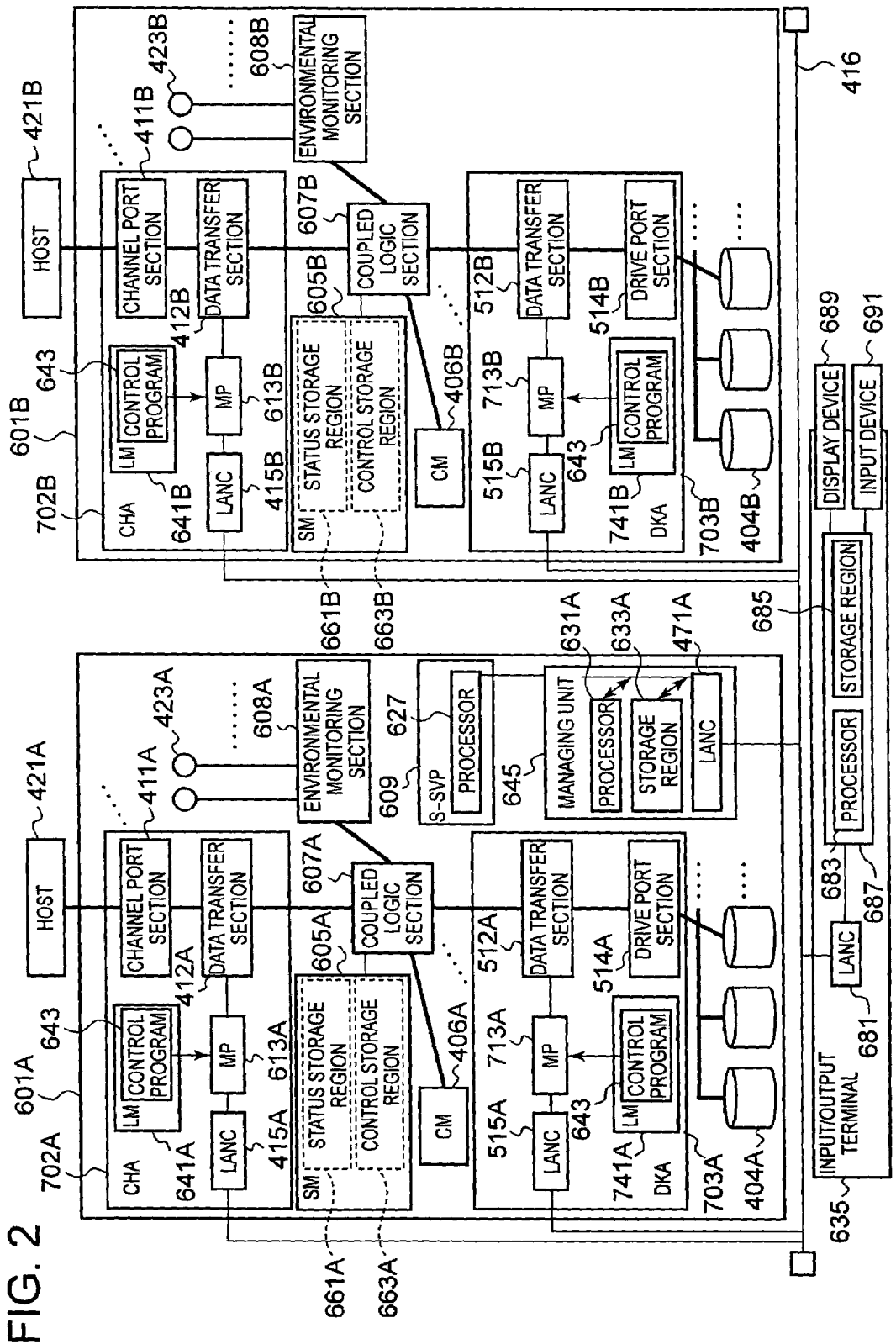
FIG. 2 shows an example of a storage system relating to a first embodiment of the present invention.

FIG. 2 shows an example of the composition of the storage system relating to one embodiment of the present invention. The storage system shown in FIG. 2 is an improvement of the storage system shown in FIG. 1. Therefore, the same reference numerals are applied to constituent elements which do not contain any substantial improvement with respect to the same constituent elements shown in FIG. 1, and different reference numerals are applied to constituent elements which do contain an improvement. The following description will focus on the points of improvement (changes) with respect to the storage system illustrated in FIG. 1, by referring to FIG. 2. Parts of the description which would duplicate the description given above are omitted or abbreviated here. Furthermore, in the following description, the storage control device 601A is taken as a representative example, but unless stated explicitly otherwise, the composition of the storage control device 601A can also be applied to the other storage control device 601B.

A storage region (hereafter, status storage region) 661A for storing environmental status information is prepared in a prescribed location of the SM 605A. The SM 605A comprises a further storage region, namely, a control storage region 663A storing a table, or the like, for managing the logical volumes provided in at least one storage device 404A, for example.

The environment monitoring section 608A is connected to various sensors 423A, such as temperature sensors, for example, and it is able to determine environmental statuses (for example, the power supply of the storage control device 601A, the temperature at a certain position, the operational status of the cooling fan, or the like) on the basis of the signal values from the various sensors 423A. The environment monitoring section 608A may be constituted by a hardware circuit, software or a combination of these. The environment monitoring section 608A is connected to the SM 605 (either directly) or via the coupled logic section 407A. The environment monitoring section 408A stores environmental status information indicating the detected environmental statuses, in a status storage region 661A of the SM 605A, either periodically or at prescribed timings (for example, if the determined environmental status indicates an abnormality). In so doing, the environment monitoring section 608A may convert the environmental status information into a format that can be interpreted by the management unit 645, and it may store the converted environmental status information in the status storage region 661A.

The coupled logic section 607A connects together the CHAs 702A, DKAs 703A, the CM 406A, the SM 605A and the environment monitoring section 608A.

The MP 613A of the CHA 702A and the MP 713A of the DKA 703A also refer to the status storage region 661A at regular or irregular intervals. Here, if the MPs 613A and 713A, for example, are processing an I/O request, the processing of the I/O request is prioritized and the processing for referring to the status storage region 661A is not performed. When the processing of the I/O request has finished, the processing for referring to the status storage region 661A is then implemented. Furthermore, if, for example, the MP 613A detects, before the MP 713A, that environmental status information has been stored which has not yet been read out by either MP, then the MP 613A reads out this environmental status information from the status storage region 661A, and it sends the environmental status information thus read out to the management unit 645, via the LANC 415A. In this case, the MP 613A is able to convert the environmental status information read out into a format that can be interpreted by the management unit 645, and it can send the converted environmental status information to the management unit 645. Furthermore, the MP 613A may also establish the fact that the environmental status information has been read out, in respect of environmental status information that has been read out. More specifically, for example, the MP 613A may delete the environmental status information that has been read out, from the status storage region 661A, and it may set a flag in the status storage region 661A which indicates that the environmental status information has been read out. Thereby, when the MP 613A or another MP subsequently refers to the status storage region 661A, it is possible to prevent that MP from reading out again environmental status information that has already been read out. Furthermore, the processing described above relating to the reading and sending of the environmental status information is carried out by a control program 643 that is read in to the MP. Therefore, it is possible to adopt the same composition for the control program 643 that is read in to each one of the plurality of MPs 613 and 713. In other words, it is possible to construct a control program 643 without paying any consideration to which MP the control program is to be read into.

Of the input/output system and the control system of the SVP, the control system, in other words, the management unit 645 is installed in the storage control device 601A. The management unit 645 receives environmental status information from the MP 613A or 713A of the storage control device 601A in which it is installed, or from the MP 613B or 713B of a storage control device 601B other than the one in which it is installed, and it stores the environmental status information thus received in the storage region 633. The management unit 645 does not necessarily have to be installed in one of the storage control devices 601 and it may also be connected to the LAN 416.

The S-SVP 609 installed in the storage control device 601A is connected to the management unit 645 and monitors whether or not the management unit 645 is operating normally. However, the S-SVP 609 does not receive environmental status information from the environment monitor 608A, and therefore it is not required to convert the format of the environmental status information. In this respect, the load on the processor 627 of the S-SVP 609 is less than that on the first processor 427A. The S-SVP 609 does not necessarily have to be installed in one of the storage control devices 601, either, and it may be connected to the management unit 645.

Since one management unit 645 manages a plurality of storage control devices 601A and 601B, a management unit 645 is not installed in the storage control device 601B, at the least. Therefore, the S-SVP 609 is not installed in the storage control device 601B either. Even if a composition of this kind is adopted, and even if the storage control device 601A and the storage control device 601B are devices of the same level, there is no relationship of dependency on another device, such as a master-slave or parent-subsidiary relationship. More specifically, for example, even if a fault occurs in the storage control device 601A, this will not necessarily affect the other storage control device 601B.

An input/output terminal 635 is connected to the LAN 416. The input/output terminal 635 inputs information to the management unit 645 and outputs information from the management unit 645. The input/output terminal 635 may be a personal computer, for example. More specifically, for example, the input/output terminal 635 may be constituted by a LANC 681, a control circuit 687 provided with a processor (for example, a CPU) 683 and a storage region (for example, memory) 685, an input device 691, such as a keyboard, and a display device 689 comprising a display screen. The environmental status information accumulated in the management unit 645 is displayed on the display device 689, via the LAN 416, for example.

The foregoing was a description of the composition of a storage system relating to one embodiment.

In this storage system, a composition is adopted in which the control system of the SVP is installed in the storage control device 601A, and the input/output system thereof is not installed in the storage control device 601A. However, it is also possible to install an SVP provided with both a control system and an input/output system, in the storage control device 601A, and simply to connect a LAN 416 to the storage control device 601A, rather than installing it therein. Furthermore, rather than a LAN 416, it is also possible to adopt a communications network of another type (in particular, a network which performs communications on the basis of an Internet protocol, for example.)

In this storage system, by implementing a processing sequence such as that described below, an IP address that is unique within the storage system is assigned to each of the MPs belonging to the storage system.

Figure 3:
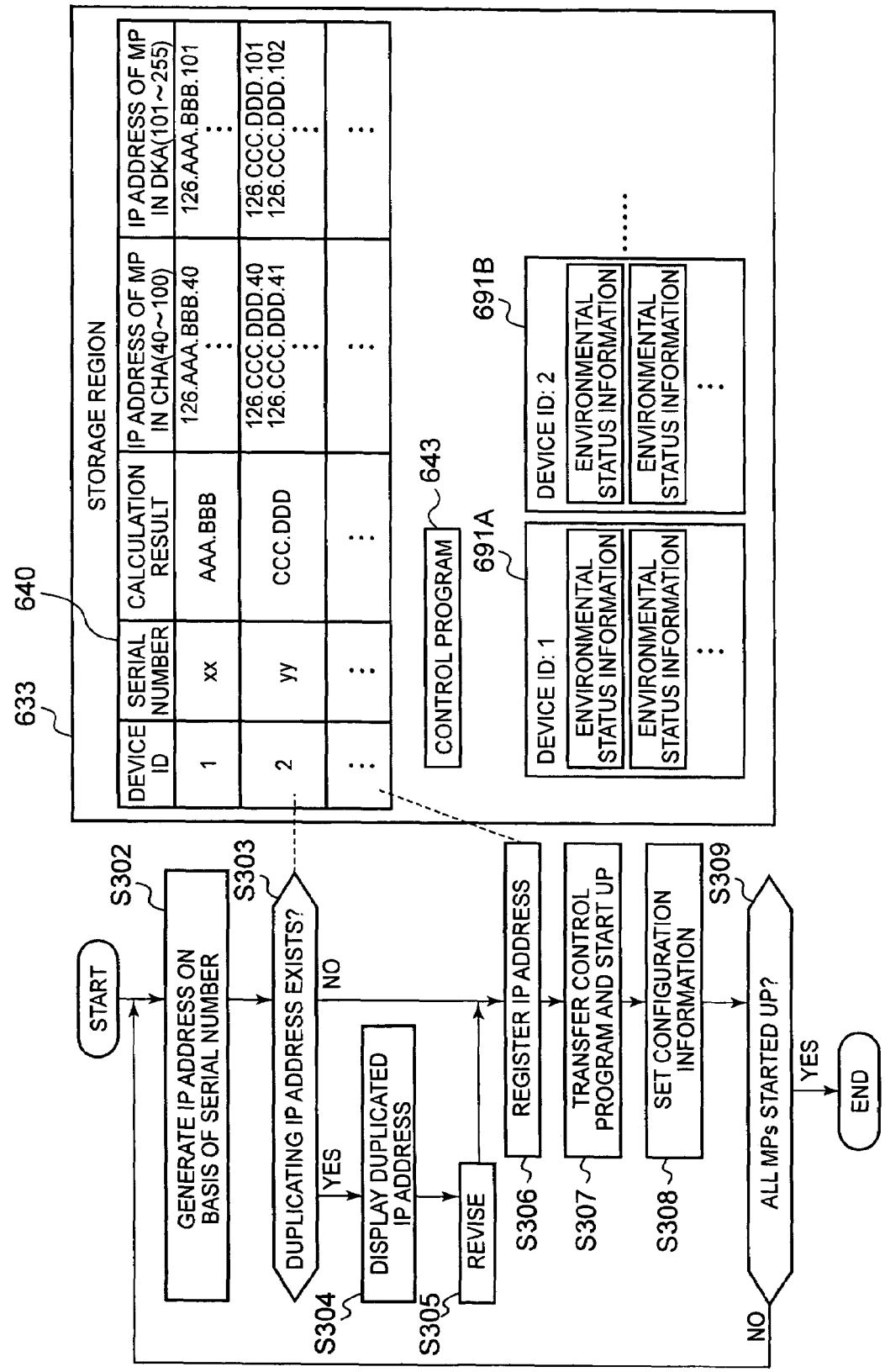
FIG. 3 shows one example of a processing sequence for assigning IP addresses which are unique in the storage system to the respective MPs of respective storage control devices.

FIG. 3 shows one example of a processing sequence for assigning unique IP addresses for the storage system to the respective MPs in the respective storage control devices.

The storage region 633 of the management unit 645 comprises a registration table 640, a control program 643 for the MPs 613 and 713, and an environmental status information storage area 691 for each of the storage control devices. For each storage control device connected to the LAN 416, information is registered in the registration table 640, namely, a device ID (for example, a number), a serial number, a calculation result calculated from the serial number using a prescribed formula (for example, the second and third octet of the IP address), the IP address of the MP of the CHA, and the IP address of the MP of the DKA. Furthermore, information indicating where the fourth octet of the IP address of the MP 613 of the CHA 702 is located between 40-100, and where the fourth octet of the IP address of the MP 713 of the DKA 703 is located between 101-255, is also registered in the registration table 640.

In this storage system, for example, the management unit 645 is able to function as a so-called Dynamic Host Configuration Protocol (DHCP) server.

At a prescribed timing or a desired timing indicated by the administrator (for example, the user of the input/output terminal 635), the management unit 645 generates an IP address on the basis of the serial number of the storage control device 601 installed in the MP forming the connection destination (step S302). The management unit 645 can identify which of the storage control devices 601 the MP forming the connection destination is installed in by receiving information relating to the storage control device 601 where that MP is installed. Moreover, the management unit 645 is also able to identify the storage control device 601 by generating a provisional IP address, accessing the MP on the basis of this address, and then receiving information (for example, the vendor name, model name, serial number, and the like) relating to the storage control device 601 in which the MP is installed, from the MP.

At S302, the management unit 645 calculates the second and third octet of the IP address on the basis of the serial number, and it can register the calculation results in the registration table 640. Furthermore, if the management unit 645 identifies the fact that a calculation result based on the serial number has already been registered, by referring to the registration table 640, then it is able to generate an IP address by using that calculation result, without performing calculation. As a calculation rule for the IP address, for example, the first octet is taken to be "126", the second and third octets are taken to be calculation results based on the serial number, and the fourth octet is taken to be a value between 40 and 100 in the case of the MP 613 and a value between 101 and 255 in the case of the MP 713. Since the serial number may be the same in the case of different models, then according to this calculation rule, the same IP address may be generated for the MP 613A and 613B of the CHAs 602A and 603B of different storage control devices.

The management unit 645 judges refers to the registration table 640, and judges whether or not an IP address which duplicates the generated IP address is already present in the registration table 640 (S303).

If the result of the judgment step in S303 indicates that a duplicate IP address is present, then the management unit 645 causes the two duplicated IP addresses to be displayed on the display device 689 of the input/output terminal 635. If one of the IP addresses is revised by the administrator (S305), then the management unit 645 is able to register the revised IP address in the registration table 640 (S306). The management unit 645 also performs the judgment step in S303 for the revised IP address, and if the judgment result is affirmative, then it performs step S304 again, whereas if it is negative, then it is able to perform S306. The management unit 645 may also revise the IP address automatically on the basis of the aforementioned calculation rule. For example, the management unit 645 may seek to generate non-duplicating IP addresses by setting the number of the fourth octet of the generated IP address (for example, 48) to the next number (for example, 49).

Provided that a unique, non-duplicating IP address has been generated, the management unit 645 registers the generated IP address in a suitable location of the registration table 640 (more specifically, a location corresponding to the MP that has been assigned that IP address) (S306). The management unit 645 transfers the control program 643 stored in the storage region 633 to the connected MP (for example, 613A), using this IP address, and it instructs the MP to start up that control program (S307). Thereby, the control program 643 is read in to the MP from the LM (for example, 641A).

Thereupon, the management unit 645 receives information used for processing the MP that has read in the control program 643 (hereafter, called "configuration information"), from the input/output terminal 635, and it sets up the configuration information thus input (for example, it registers the information in the LM 641A) (S308).

The management unit 645 carries out the processing in steps S302 to S308 for all of the MPs (S309).

By means of the foregoing processing sequence, it is possible to prevent the existence of duplicated IP addresses in the storage system. In other words, for example, if the storage control device connected to the management unit 645 is changed from 601A to 601B, then if measures such as those described above are not adopted, it is not possible to ascertain the IP address that has been assigned to the MPs 613A and 713A of the storage control device 601A. Consequently, there is a risk that an IP address which duplicates an IP address previously assigned to the MP 613A or 713A may be generated and assigned to the MP 613B or 713B of the storage control device 601B forming the connection destination after switching. However, by adopting the measures described above, it is possible to prevent such situations occurring, in advance.

Figure 4:
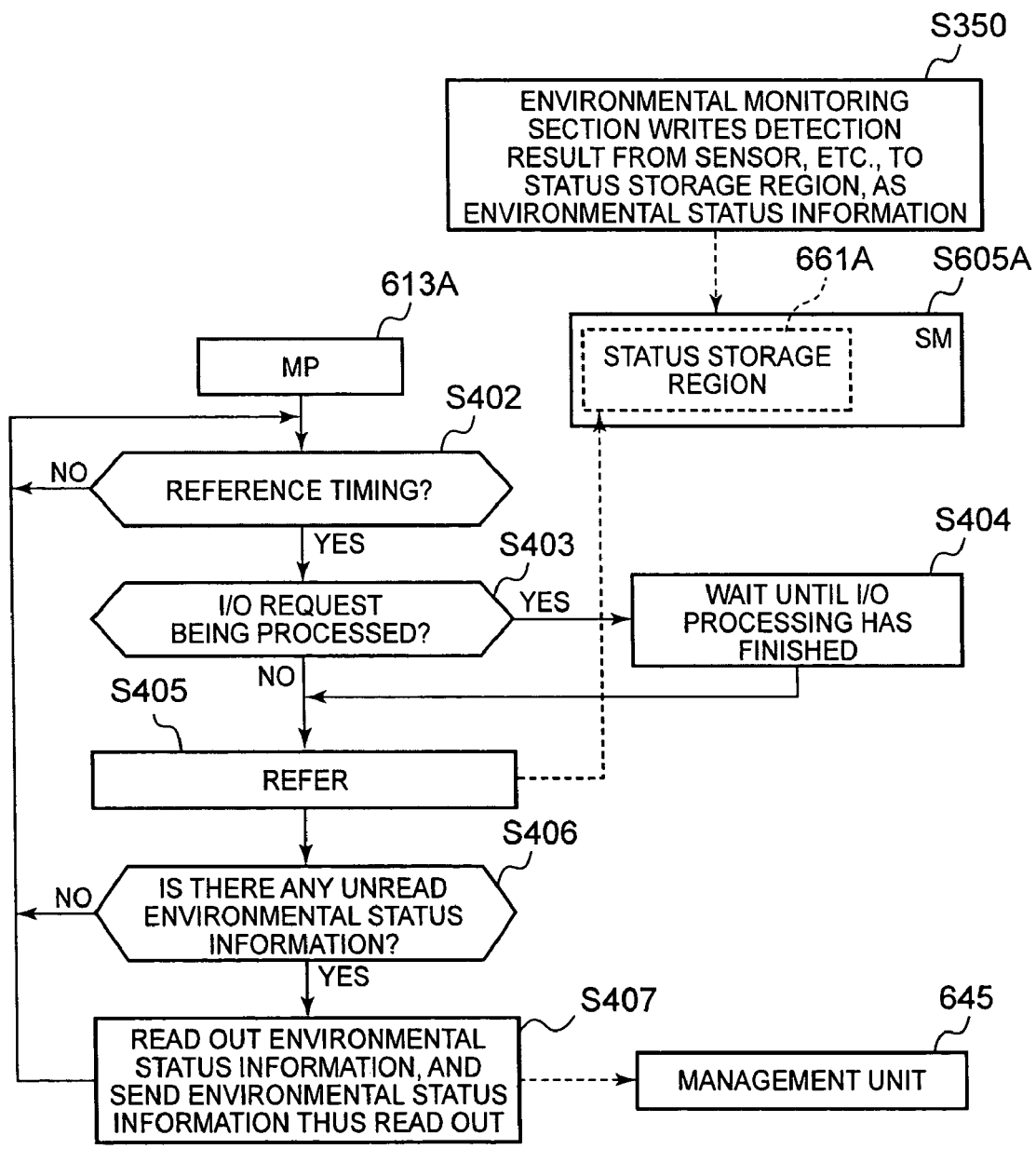
FIG. 4 shows one example of a processing sequence implemented in the storage control device 601A until environmental status information is sent to the management unit 645.

FIG. 4 shows one example of a processing sequence implemented in the storage control device 601A until environmental status information is sent to the management unit 645.

The environment monitoring section 608A takes the detection results from the sensor 423A, or the like (for example, a signal value), as environmental status information, and writes this information to the status storage region 661A (S350).

At the reference timing (YES at S402), if the MP 613A (more specifically, the control program 643 read in to the MP 613A) is currently processing an I/O request when referenced (YES at S403), then the sequence waits until that processing terminates (S404). If the MP 613A is not processing an I/O request, then it references the status storage region 661A (S405).

If, as a result of S405, environmental status information that has not been read out by any MP is found to be present in the status storage region 661A (YES at S406), then the MP 613A reads out that environmental status information from the status storage region 661A and sends the environmental status information thus read out to the management unit 645 (S407). The management unit 645 refers to the registration table 640, by using the IP address of the MP to which the environmental status information is to be sent as a key. It then selects a storage destination area from the plurality of environmental status storage areas 691 (in other words, an area corresponding to the storage control device in which the destination MP is installed) 691, and it stores the received environmental status information in the selected area 691.

Needless to say, the processing in steps S402 to S407 may also be carried out by the other MPs 713A, 613B and 713B. Moreover, the MP 613A may also establish that the environmental status information has been read out, at step S407, for example. More specifically, for example, the MP 613A may delete the environmental status information that has been read out, from the status storage region 661A, and it may set a flag in the status storage region 661A to indicate that that environmental status information has been read out. In this way, at the following step S406, it is possible to judge whether or not there exists any environmental status information that has been read out.

The foregoing was a description of a first practical example.

Figure 5:
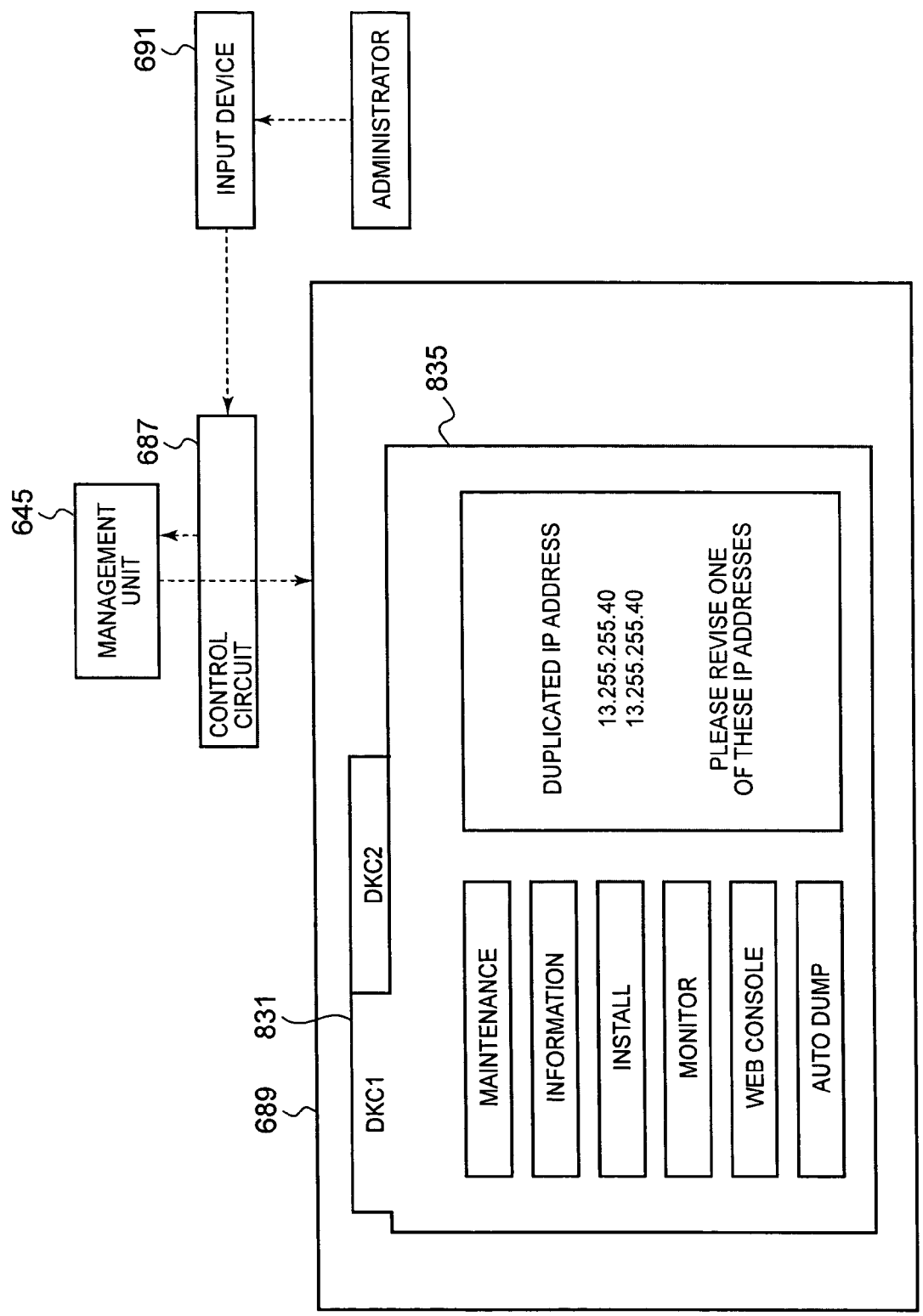
FIG. 5 shows one example of the composition of a screen displayed by the management unit 645.

In this first practical example, for example, if there are duplicated IP addresses, the management unit 645 is able to display the two duplicated IP addresses on the display device 689, by means of a method such as that shown in FIG. 5, for example. For example, as shown in the example in FIG. 5, if the tag 831 of a particular storage control device 601A has been selected, then the management unit 645 displays a screen 835 having that tag and it is able to display information relating to that storage control device 601A on the screen 835. In this case, if there are duplicated IP addresses, or the like, then the management unit 645 is able to display common information for a plurality of storage control devices 601, even though the tag of one of the plurality of storage control devices 601 is selected. Furthermore, if the management unit 645 has received a revised IP address from the administrator, via the input device 691 and the control circuit 687, then it is able to register the revised IP address in the registration table 640 of the storage region 633.

Figure 6:
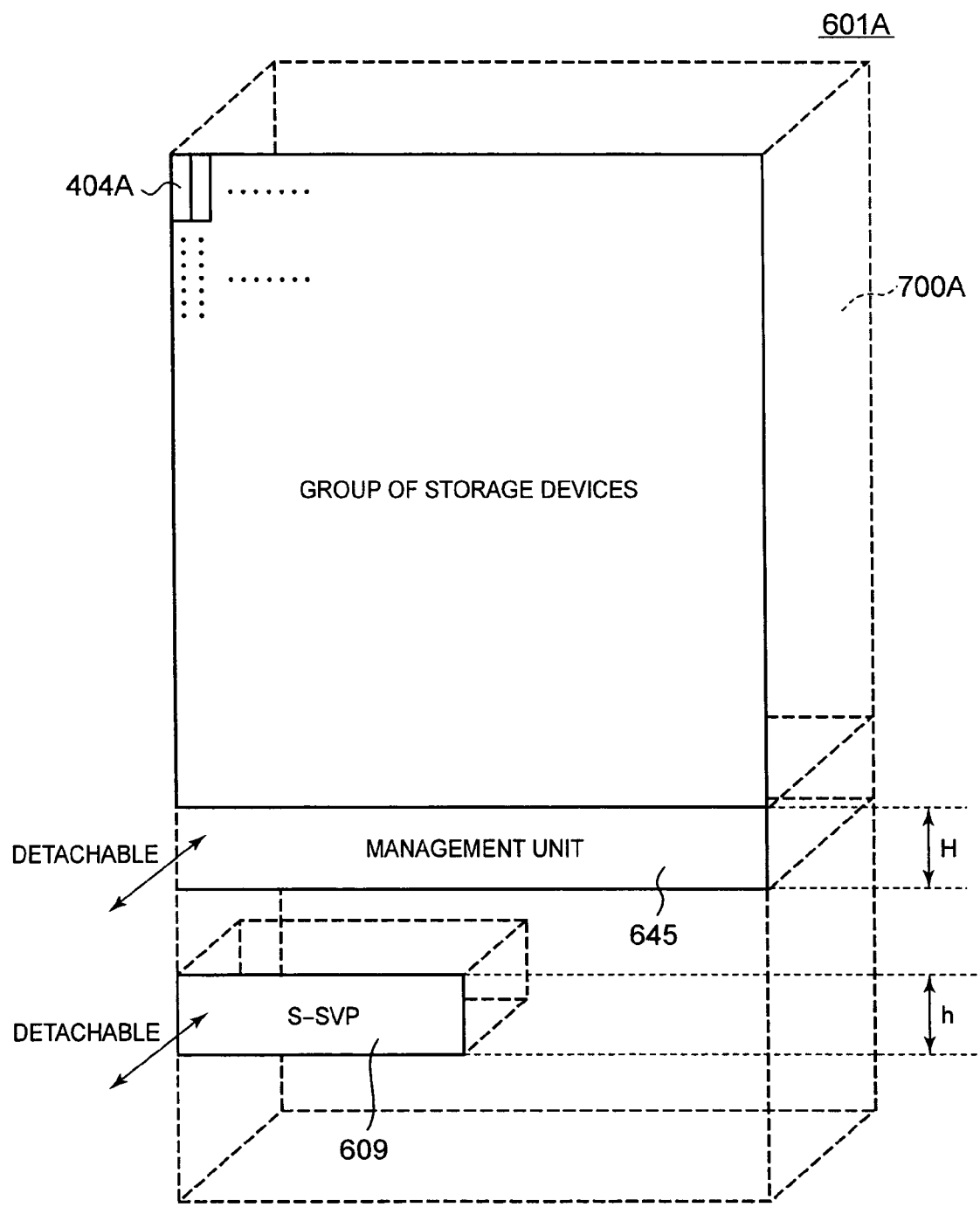
FIG. 6 shows an example of the external composition of a storage control device.

Furthermore, in the first embodiment, as shown in the example in FIG. 6, each of the storage control devices 601 may be a so-called rack-mounted device, for example. In other words, the storage control device 601A has a frame body 700A, for instance, and a plurality of storage devices 404A (such as hard disk drives), a CHA 702A, DKA 703A, CM 406A and SM 605A, and the like, can be installed inside the frame body 700A. Furthermore, the frame body 700A comprises a space in which a management unit 645 can be installed and a space in which an S-SVP 609 can be installed. The management unit 645 and S-SVP 609 are installed detachably in the frame body 700A. The composition of the frame body 700A may also be applied to the frame body of the other storage control device 601B. In other words, in the first practical example, the user is able to select any one storage control device of a plurality of storage control devices, and install a management unit 645 and S-SVP 609 in the selected storage control device. Furthermore, in the first practical example, the dimensions of the management unit 645 and the S-SVP 609 (the height H and h) may be determined on the basis of prescribed standards (for example, a dimension of 1 U).

Above, according to the first practical example described above, in the respective storage control devices 601, the monitoring results for the environmental status (namely, environmental status information) are stored in a status storage region 661, which is a prescribed location that can be accessed by a plurality of MPs. The environmental status information stored in this storage region 661 is read out by the first MP that discovers the information, 613 or 713, and is transferred to the management unit 645. In this way, it becomes possible to manage a plurality of storage control devices 601A and 601B by means of a single management unit 645, without making significant design modifications to the constituent elements of the respective storage control devices 601A and 601B.

According to the first practical example described above, when IP addresses are assigned to the MPs of the respective storage control devices, a check for the presence of duplicated IP addresses is made, and if duplicated IP addresses exist, the IP addresses are revised. Therefore, even if one management unit 645 controls a plurality of storage control devices 601A and 601B, it is still possible to assign IP addresses that are unique in the storage system, to the MPs 613 and 713 of the storage control devices 601.

Moreover, according to the first practical example described above, the management unit 645 is mounted in the storage control device 601A, rather than in an SVP formed by a personal computer. In device to device connections, there is the issue of compatibility between devices, but since personal computers themselves are gradually upgraded, then even if there has been good compatibility with the SVP prior to upgrading, the compatibility with the SVP 410 may deteriorate after upgrading. According to this first practical example, as described above, since the management unit 645 is installed in the storage control device 601A, rather than in a SVP formed by a personal computer, it is possible to reduce the occurrence of situations of this kind.

SECOND PRACTICAL EXAMPLE

A second practical example of the present invention will now be described. The following description will focus principally on the points of difference with respect to the first practical example.

Figure 7:
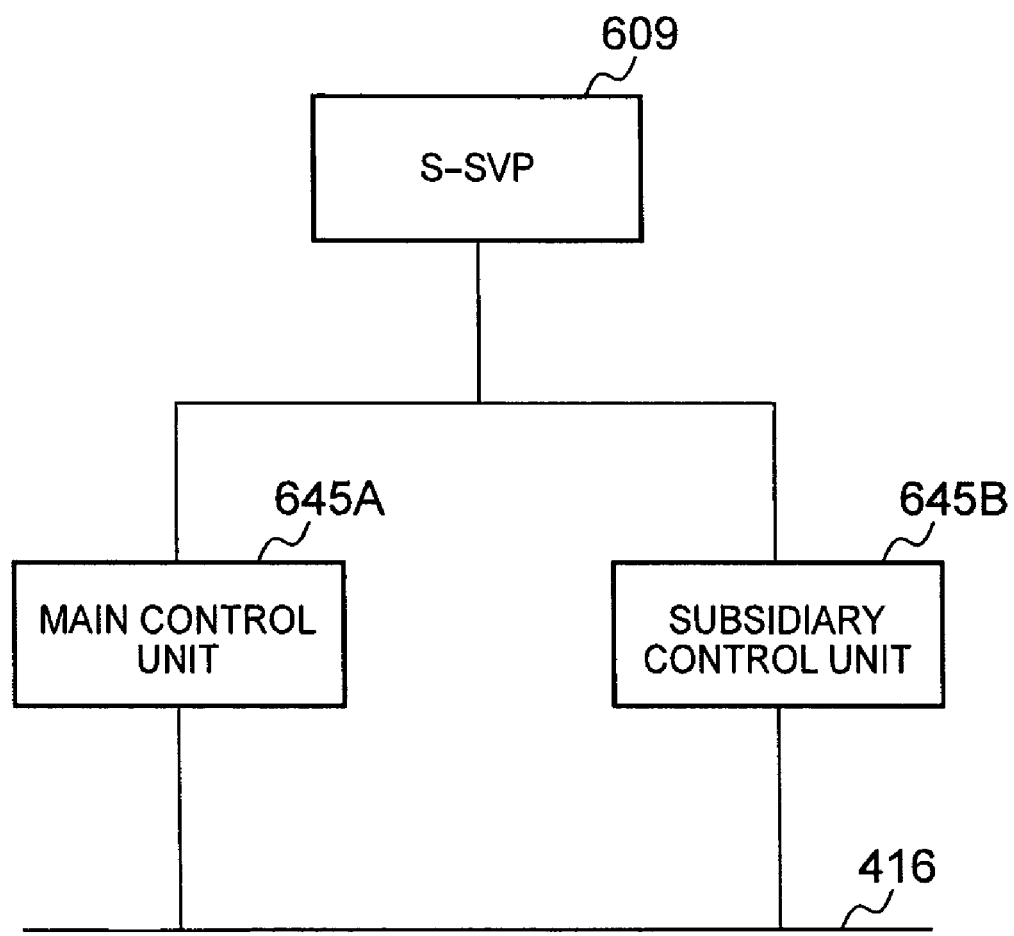
FIG. 7 is an illustrative diagram of a second embodiment of the present invention.

As shown in FIG. 7, in this second practical example, the storage system may be provided with dual management units 645A and 645B.

Normally, the main management unit 645A operates. The main management unit 645A reports the information stored in its own storage region 633 (for example, the contents of the registration table 640) to the management unit 645B, at regular or irregular intervals. The subsidiary management unit 645B stores the information thus reported in its own storage region 633. By means of this processing, it is possible to synchronize the main management unit 645A and the subsidiary management unit 645B.

The S-SVP 609 monitors the operational status of the main management unit 645A that is functioning. If a problem has occurred in the main management unit 645A, then the S-SVP 609 shuts off the power supply to the main management unit 645A and switches on the power supply to the management unit 645B, thereby making the subsidiary management unit 645A operate as a main management unit.

This system may adopt technology disclosed in Japanese Patent Laid-open No. 2003-157180.

Several preferred practical examples of the present invention were described above, but these are examples for the purpose of describing the present invention and the scope of the present invention is not limited to these practical examples only. The present invention may be implemented in various other modes.

What is claimed is:

1. A system comprising:
   a management unit;
   a first device connected to said management unit; and
   a second device connected to said management unit;
   wherein said first device comprises:
   a first storage region for storing first device status information which is information indicating a status relating to said first device; and
   a first control section for sending first device status information stored in said first storage region to said management unit; and
   said second device comprises:
   a second storage region for storing second device status information which is information indicating a status relating to said second device; and
   a second control section for sending second device status information stored in said second storage region to said management unit, wherein
   said first device and said second device respectively have a first ID and a second ID;
   there being cases where the second ID of said first device and the second ID of the second device are the same as each other, even if the first ID of said first device and the first ID of said second device are different to each other;
   said first control section is a first processor which operates by reading in a first computer program;
   said second control section is a second processor which operates by reading in a second computer program;
   said first processor, said second processor and said management unit are connected to a communications network which allows communications to be performed on the basis of IP addresses;
   said system comprises a subsidiary management unit for managing whether or not said management unit is operating normally;
   said subsidiary management unit is not connected to said communications network, but is connected to said management unit;
   said management unit generates a first IP address on the basis of the second ID of said first device, generates a second IP address on the basis of the second ID of said second device, checks whether or not said first IP address and said second IP address are mutually duplicating, and outputs the result of said check;
   said first device comprises a first memory having a plurality of storage regions including said first storage region, and a first status writing unit which inputs a status relating to said device, and writes the information indicating a status thus input, to said first storage region, as said first device status information;
   said second device comprises a second memory having a plurality of storage regions including said second storage region, and a second status writing unit which inputs a status relating to said device, and writes the information indicating a status thus input, to said second storage region, as said second device status information;
   said first computer program read in by said first processor refers to said first storage region, and if it detects that said first device status information is stored in said first storage region, then it sends said first device status information to said management unit via said communications network; and
   said second computer program read in by said second processor refers to said second storage region, and if it detects that said second device status information is stored in said second storage region, then it sends said second device status information to said management unit via said communications network.

2. The system according to claim 1, wherein at least said first device is a storage control device provided with a storage device capable of storing data;
   said storage control device is connected to a host device which transmits a write command for writing data to said storage device or a read command for reading out data from said storage device; and
   if said first computer program seeks to refer to said first storage region while said write command or said read command is being processed, then the first computer program refers to said first storage region when the processing of the write command or read command has finished.

3. A method comprising the steps of:
   storing first device status information which is information indicating a status relating to a first device, in a first storage region;
   sending the first device status information stored in said first storage region to a management unit;
   storing second device status information which is information indicating a status relating to a second device, in a second storage region;
   sending the second device status information stored in said second storage region to said management unit, wherein
   said first device and said second device respectively have a first ID and a second ID;
   there being cases where the second ID of said first device and the second ID of the second device are the same as each other, even if the first ID of said first device and the first ID of said second device are different to each other;
   said first device comprises a first processor which operates by reading in a first computer program;
   said second device comprises a second processor which operates by reading in a second computer program;
   said first processor, said second processor and said management unit are connected to a communications network which allows communications to be performed on the basis of IP addresses; and
   said method further comprises a step whereby a subsidiary management unit which is not connected to said communications network, but is connected to said management unit, manages whether or not said management unit is operating normally; and the steps of:
   generating a first IP address on the basis of the second ID of said first device;
   generating a second IP address on the basis of the second ID of said second device;
   checking whether or not said first IP address and said second IP address are mutually duplicating;
   outputting the result of said check;
   inputting a status relating to said first device, and writing the information indicating a status thus input, to said first storage region, as said first device status information;
   inputting a status relating to said second device, and writing the information indicating a status thus input, to said second storage region, as said second device status information;

referring to said first storage region, and sending said first device status information to said management unit via said communications network, if it is detected that said first device status information has been stored in said first storage region; and referring to said second storage region, and sending said second device status information to said management unit via said communications network, if it is detected that said second device status information has been stored in said second storage region.

4. The method according to claim 3, wherein at least said first device is a storage control device provided with a storage device capable of storing data;

said storage control device is connected to a host device which transmits a write command for writing data to said storage device or a read command for reading out data from said storage device; and said method further comprises:

a step whereby, if it is sought to refer to said first storage region while said write command or said read command is being processed, then said first storage region is referred to when the processing of the write command or read command has finished.

* * * * *